US012630973B2

(12) United States Patent
Yamada et al.

(10) Patent No.: US 12,630,973 B2
(45) Date of Patent: May 19, 2026

(54) RECORDING METHOD

(71) Applicant: SEIKO EPSON CORPORATION, Tokyo (JP)

(72) Inventors: Akiko Yamada, Shiojiri (JP); Kosuke Chidate, Shiojiri (JP); Daisuke Sakuma, Minowa (JP); Takamitsu Kondo, Azumino (JP)

(73) Assignee: SEIKO EPSON CORPORATION (JP)

( * ) Notice: Subject to any disclaimer, the term of this patent is extended or adjusted under 35 U.S.C. 154(b) by 396 days.

(21) Appl. No.: 18/115,024

(22) Filed: Feb. 28, 2023

(65) Prior Publication Data

US 2023/0313451 A1     Oct. 5, 2023

(30) Foreign Application Priority Data

Mar. 1, 2022     (JP) ................................. 2022-030784

(51) Int. Cl.
D06P 5/08          (2006.01)
B41J 2/21          (2006.01)
(Continued)

(52) U.S. Cl.
CPC ............... D06P 5/08 (2013.01); B41J 2/2114 (2013.01); B41J 3/4078 (2013.01); (Continued)

(58) Field of Classification Search
CPC ........ D06P 5/08; D06P 1/5278; D06P 1/5285; D06P 1/54; D06P 5/30; D06P 1/44; D06P 1/445; D06P 1/5221; D06P 1/5235; D06P 1/5257; D06P 1/5271; D06P 1/6424;

D06P 1/6735; D06P 3/58; D06P 5/02; B41J 3/4078; B41J 2/2117; B41J 2/2114; B41J 11/0015; B41J 2/01; B41M 5/0017; B41M 5/0047; C09D 11/037; C09D 11/102; C09D 11/322; C09D 11/54
See application file for complete search history.

(56) References Cited

U.S. PATENT DOCUMENTS 11,845,871 B2 * 12/2023 Okada ..................... D06P 5/225
2016/0303872 A1   10/2016 Okuda et al.
(Continued)

FOREIGN PATENT DOCUMENTS

JP          2016089288 A  *  5/2016
JP          2016-199001 A    12/2016
JP          2019-042982 A     3/2019

*Primary Examiner* — Douglas X Rodriguez
*Assistant Examiner* — Natasha Dephenia Quinn
(74) *Attorney, Agent, or Firm* — Harness, Dickey & Pierce, P.L.C.

(57)          ABSTRACT

A recording method according to an embodiment of the present disclosure is a recording method on a fabric, including an ink adhering step of adhering droplets of an ink composition containing a pigment and resin particles to the fabric; and a treatment solution adhering step of adhering droplets of a treatment solution containing a crosslinking agent to the fabric, in which a maximum weight per droplet of the droplet of the ink composition is 30 ng or less, a maximum weight per droplet of the droplet of the treatment solution is 30 ng or less, and a droplet weight of the treatment solution is equal to or less than a droplet weight of the ink composition.

11 Claims, 4 Drawing Sheets

(51) Int. Cl.

| | |
|---|---|
| *B41J 3/407* | (2006.01) |
| *B41M 5/00* | (2006.01) |
| *C09D 11/037* | (2014.01) |
| *C09D 11/102* | (2014.01) |
| *C09D 11/322* | (2014.01) |
| *C09D 11/54* | (2014.01) |
| *D06P 1/52* | (2006.01) |
| *D06P 1/54* | (2006.01) |
| *D06P 5/30* | (2006.01) |

(52) U.S. Cl.
CPC ......... *B41M 5/0017* (2013.01); *C09D 11/037* (2013.01); *C09D 11/102* (2013.01); *C09D 11/322* (2013.01); *C09D 11/54* (2013.01); *D06P 1/5278* (2013.01); *D06P 1/5285* (2013.01); *D06P 1/54* (2013.01); *D06P 5/30* (2013.01); *B41J 2/2117* (2013.01)

(56) References Cited

U.S. PATENT DOCUMENTS

| | | | |
|---|---|---|---|
| 2019/0061382 A1 | 2/2019 | Okuda et al. | |
| 2019/0283464 A1* | 9/2019 | Matsuzaki | B41J 2/2117 |
| 2019/0329579 A1* | 10/2019 | Okuda | B41M 5/0017 |
| 2020/0207136 A1* | 7/2020 | Miyasa | D06P 1/54 |
| 2021/0301167 A1 | 9/2021 | Okada et al. | |

* cited by examiner

RECORDING METHOD

The present application is based on, and claims priority from JP Application Serial Number 2022-030784, filed Mar. 1, 2022, the disclosure of which is hereby incorporated by reference herein in its entirety.

BACKGROUND

1. Technical Field

The present disclosure relates to a recording method.

2. Related Art

In the related art, when dyeing is performed on a base material such as a fabric with a coloring material such as a pigment by an ink jet method to produce a printed matter, in order to improve color developing properties of the coloring material, a technique of performing pretreatment on the base material using a treatment solution containing a cationic compound or the like was known. Among these, examination is performed on a recording method in which a pretreatment and an ink adhering step are performed by a recording apparatus.

For example, JP-A-2016-089288 discloses a wet-on-wet type ink jet printing method performing steps from a step of adhering a pretreatment solution containing a polyvalent metal compound to a step of adhering an ink passing through a drying step, in printing using an ink composition containing a pigment.

However, in such a method, there is a problem that color developing properties and friction fastness are easily deteriorated.

SUMMARY

An aspect of a recording method according to the present disclosure includes a recording method on a fabric, the method including: an ink adhering step of adhering droplets of an ink composition containing a pigment and resin particles to the fabric; and a treatment solution adhering step of adhering droplets of a treatment solution containing a crosslinking agent to the fabric, in which a maximum weight per droplet of the droplet of the ink composition is 30 ng or less, a maximum weight per droplet of the droplet of the treatment solution is 30 ng or less, and a droplet weight of the treatment solution is equal to or less than a droplet weight of the ink composition.

DESCRIPTION OF EXEMPLARY EMBODIMENTS

Figure 1:
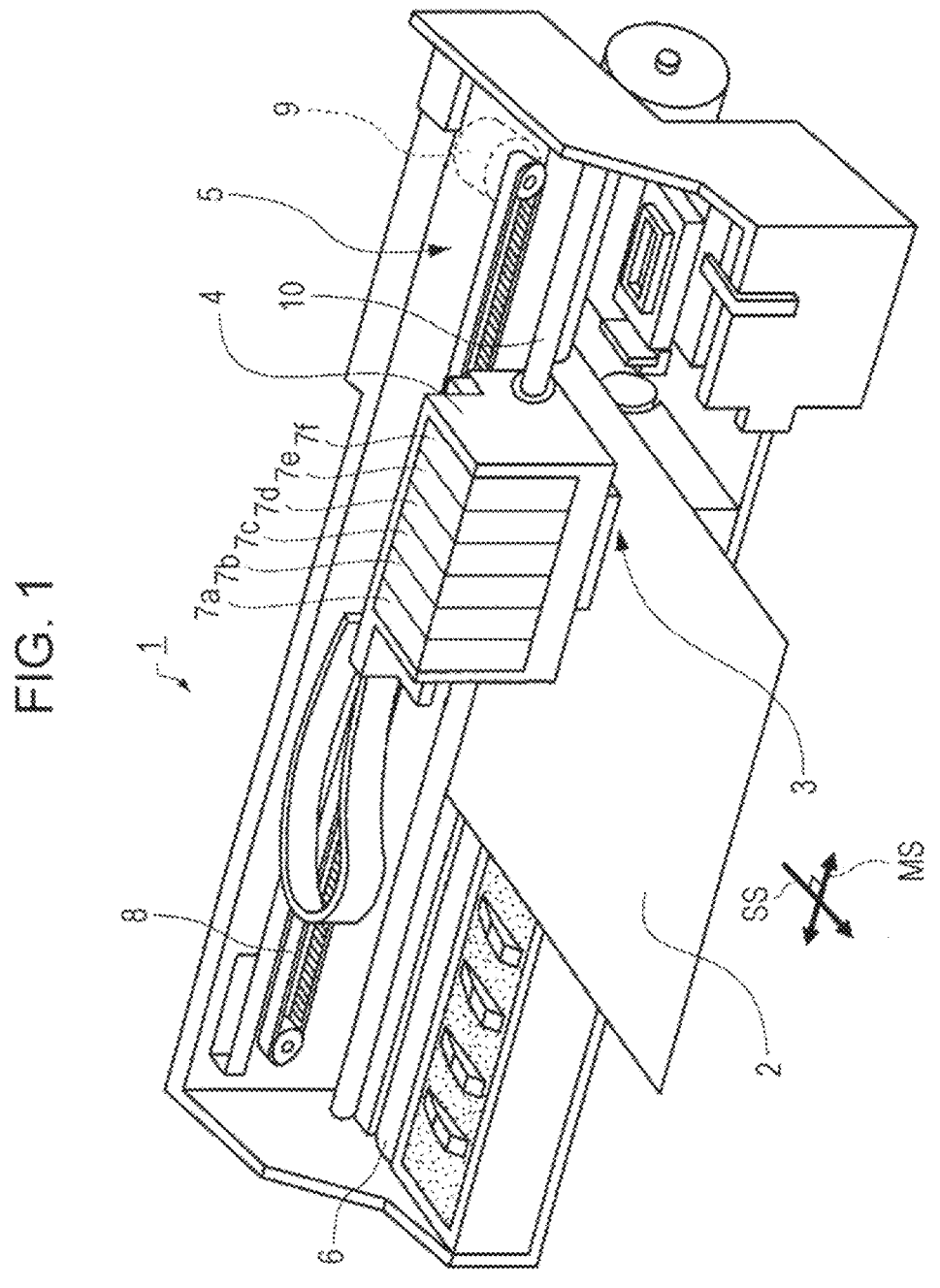
FIG. 1 is a schematic perspective view of an ink jet printing apparatus applicable to the recording method according to the present embodiment.

Hereinafter, embodiments of the present disclosure will be described. The embodiments described below describe examples of the present disclosure. The present disclosure is not limited to the following embodiments, and includes various modifications implemented within a range not changing the gist of the present disclosure. It should be noted that not all of the configurations described below are essential configurations of the present disclosure.

1. Recording Method

A recording method according to an embodiment of the present disclosure is a recording method on a fabric, which includes an ink adhering step of adhering droplets of an ink composition containing a pigment and resin particles to a fabric, and a treatment solution adhering step of adhering droplets of a treatment solution containing a crosslinking agent to the fabric, and in which a maximum weight per droplet of the ink composition is 30 ng or less, the maximum weight per droplet of the treatment solution is 30 ng or less, and a droplet weight of the treatment solution is equal to or less than a droplet weight of the ink composition.

In the related art, when dyeing is performed on a base material such as a fabric with a coloring material such as a pigment by an ink jet method to produce a printed matter, in order to improve color developing properties of the coloring material, a technique of performing pretreatment on a base material using a treatment solution containing a cationic compound or the like is known. The pretreatment in ink jet pigment printing is usually performed by a dipping method or the like using a separate apparatus/equipment. However, in such a method, it is not only necessary to use a separate apparatus/equipment, but also steps become complicated or know-how is required by using the separate apparatus/ equipment. In addition, since waste liquid is discharged, the method is not preferable from a viewpoint of environmental load.

Therefore, in ink jet pigment printing, an examination is performed on a recording method (pretreatment in-line process) in which a pretreatment solution step performed for reducing ink bleeding and improving color developing properties and an ink adhering step are performed with one recording apparatus. With such a method, the steps can be simplified and the discharge of waste liquid can also be eliminated. In particular, the wet-on-wet method, which omits drying between the pretreatment solution step and the ink adhering step, has advantages in terms of miniaturization and high speed of the apparatus, but there is a problem in that bleeding, color developing properties, and friction fastness are easily deteriorated. It is presumed that this is due to an increase in an amount of moisture on a recording medium. That is, it is presumed that when the amount of moisture on the recording medium is large, bleeding easily occurs, when the amount of moisture on the recording medium is large, aggregation reaction between the treatment solution and the ink is less likely to proceed and color developing properties are easily deteriorated, and when the amount of moisture on the recording medium is large, drying easily becomes insufficient and friction fastness is easily deteriorated.

On the other hand, the present inventors recently newly found that by containing a crosslinking agent in a treatment solution, and applying an ink and the treatment solution in a specific aspect, color developing properties and friction fastness can be excellent. That is, according to a recording method according to the present embodiment, by containing a crosslinking agent in a treatment solution, and applying an ink and the treatment solution such that a droplet size of the treatment solution is equal to or less than a droplet size of the ink at 30 ng/droplet or less, it was possible to make color developing properties and friction fastness favorable. By reducing the droplet size to 30 ng or less and further setting the droplet size of the treatment solution to be equal to or less than the droplet size of the ink, the ink and the treatment solution are easily mixed. With this, reaction between resin particles in the ink and the crosslinking agent in the treatment solution easily proceeds, the ink is effectively thickened and aggregated, and the ink stays in the vicinity of a surface of the fabric to make color developing properties favorable. In addition, an ink layer is toughened by crosslinking of the crosslinking agent, and the friction fastness is improved.

The recording method according to the present embodiment is performed on a fabric. The material constituting the fabric is not particularly limited, and examples thereof may include natural fibers such as cotton, linen, wool, and silk; synthetic fibers such as polypropylene, polyester, acetate, triacetate, polyamide, and polyurethane, and biodegradable fibers such as polylactic acid, and blended fibers thereof.

The fabric preferably has a hydroxyl group. Examples of such a fabric include a fabric containing cellulose such as cotton and linen, a fabric containing polyurethane, and the like. When the fabric has a hydroxyl group, there is a case in which a crosslinking reaction occurs between a crosslinking agent contained in the treatment solution and the hydroxyl group of the fabric, and it is possible to obtain the effect of improving color developing properties by thickening aggregation and of improving friction fastness by improving adhesive properties between the fabric and the ink layer.

As the fabric, the fiber may be any form of a woven fabric, a knitted fabric, a non-woven fabric, and the like. In addition, a basis weight of the fabric used in the present embodiment is not particularly limited, and may be 1.0 oz or more and 10.0 oz or less, preferably 2.0 oz or more and 9.0 oz or less, more preferably 3.0 oz or more and 8.0 oz or less, and further more preferably 4.0 oz or more and 7.0 oz or less. When the basis weight of the fabric is within such a range, favorable recording can be performed. In addition, in the ink jet recording method according to the present embodiment, a plurality of types of fabrics having different basis weights can be applied, and favorable printing can be performed.

In the present embodiment, examples of the form of the fabric include cloth, garment or other clothing items, and the like. The cloth includes a woven fabric, a knitted fabric, a non-woven fabric, and the like. Garment or other clothing items include sewn T-shirts, handkerchiefs, scarves, towels, handbags, cloth bags, and furniture cloth such as curtains, sheets, bedspreads, and wallpaper, cloth before and after cutting as parts to be sewn, and the like. Examples of these forms include a long roll-shaped one, a long one cut into a predetermined size, a product-shaped one, and the like.

As the fabric, a cotton fabric pre-colored with a dye may be used. Examples of dyes in which the fabric is pre-colored include water-soluble dyes such as acidic dyes and basic dyes, disperse dyes in which dispersants are used in combination, reactive dyes, and the like. When a cotton fabric is used as the fabric, a reactive dye suitable for dyeing cotton is preferably used.

Hereinafter, each step of the recording method according to the present embodiment will be described.

1. 1 Ink Adhering Step

A recording method according to the present embodiment includes an ink adhering step of adhering droplets of an ink composition containing a pigment and resin particles to a fabric.

1. 1. 1 Droplet Weight of Ink Composition

In the recording method according to the present embodiment, a maximum weight per droplet of the droplet of the ink composition is 30 ng or less, and the droplet weight of the treatment solution to be described later is equal to or less than the droplet weight of the ink composition.

The maximum weight per droplet of the droplet of the ink composition is preferably 29 ng or less, more preferably 28 ng or less, further more preferably 27 ng or less, even more preferably 26 ng or less, particularly preferably 25 ng or less, and particularly preferably 24 ng or less. A lower limit of the maximum weight per droplet of the droplet of the ink composition is not particularly limited, but is preferably 11 ng or more, more preferably 15 ng or more, further more preferably 19 ng or more, and particularly preferably 23 ng or more. When the maximum weight per droplet of the droplet of the ink composition is within the above-mentioned range, there is a case in which the ink and the treatment solution are more easily mixed with each other, and color developing properties and friction fastness are further improved.

The weight per droplet of the droplet of the ink composition or the treatment solution to be described later can be measured from a change in a solution amount when a resolution of an image and a Duty are known. For example, ink ejection amount [ng/dot]=ink adhesion amount per unit area $[mg/inch^2]/(resolution [dot/inch^2] \times Duty \times 10^{-6})$ can be calculated. In addition, "Duty" is a value calculated by "Duty"=number of actual recorded dots/(vertical resolution×horizontal resolution)×100 (in the formula, "number of actual recorded dots" is the number of actual recorded dots per unit area, and "vertical resolution" and "horizontal resolution" are each resolution per unit area).

In the recording method according to the present embodiment, the droplet weight of the treatment solution to be described later is equal to or less than the droplet weight of the ink composition, and preferably the droplet weight of the treatment solution is smaller than the droplet weight of the ink composition. In such an aspect, since the ink and the treatment solution are more easily mixed, and the crosslinking agent contained in the treatment solution can be more uniformly applied to the fabric, color developing properties and friction fastness are more excellent.

In addition, in the comparison between the droplet weight of the ink composition and the droplet weight of the treatment solution, it is assumed that an average value of the droplet weight of the ink composition adhered per unit area and an average value of the droplet weight of the treatment solution adhered per unit area are compared with each other.

In addition, an adhesion amount of the ink composition is preferably 10 to 21 $mg/inch^2$, more preferably 12 to 20 $mg/inch^2$, and further more preferably 14 to 19 $mg/inch^2$, and particularly preferably 15 to 18 $mg/inch^2$ per unit area of the recording region of the fabric.

1. 1. 2 Step Interval

In the recording method according to the present embodiment, the time difference between the ink adhering step and the treatment solution adhering step to be described later is preferably within 5 seconds. When the ink adhering step and the treatment solution adhering step are performed with such a time difference, a wet-on-wet method in which the second droplet to be adhered later is adhered before the first droplet previously adhered dries can be used. When the first droplet is an ink composition, the second droplet is a treatment solution, and when the first droplet is a treatment solution, the second droplet is an ink composition. The wet-on-wet method has advantages in terms of miniaturization and high speed of the apparatus, whereas the method has a problem of being easily deteriorated in bleeding, color developing properties, and friction fastness, but according to the recording method according to the present embodiment, it is possible to obtain excellent color developing properties and friction fastness, and it is also possible to suppress bleeding even in such a wet-on-wet method. In addition, in the recording method according to the present embodiment, when the time difference between the step intervals is within 5 seconds, there is a tendency that the reaction between the ink and the treatment solution more easily proceeds, and color developing properties and friction fastness become more excellent.

In the present disclosure, the time difference between the ink adhering step and the treatment solution adhering step means a time difference from the last ejection of the treatment solution to the first ejection of the ink composition. In particular, it refers to a time difference between the last ejection of the treatment solution and the first ejection of the ink composition with respect to the same region of the fabric.

In addition, in the following description, "alternate strike" means that the ink composition and the treatment solution are adhered to the same main scanning (moving the ink jet head in a direction perpendicular to a transport direction of the fabric) on the same scanning region of the fabric to form a layer containing the ink composition and the treatment solution. "First strike" means that the ink composition and the treatment solution are adhered to the same scanning region of the fabric by different main scanning to form a layer containing the treatment solution and laminate a layer containing the ink composition thereon. In particular, when the layer containing the treatment solution is first formed and then the layer containing the ink composition is formed by being laminated thereon is referred to as "treatment solution first strike".

In the case of alternate strike, the time difference between the ink adhering step and the treatment solution adhering step is preferably 1 second or less, more preferably 0.8 seconds or less, further more preferably 0.6 seconds or less, and particularly preferably 0.4 seconds or less. A lower limit is not particularly limited, but is preferably 0.01 seconds or more, and more preferably 0.1 seconds or more. In the case of alternate strike, the time difference between the ink adhering step and the treatment solution adhering step is particularly preferably 0.3 seconds. With such a time difference, there is a tendency that the reaction between the ink and the treatment solution more easily proceeds, and color developing properties and friction fastness become more excellent.

In the case of treatment solution first strike, the time difference between the ink adhering step and the treatment solution adhering step is preferably 4.9 seconds or less, more preferably 4.8 seconds or less, further more preferably 4.7 seconds or less, and particularly preferably 4.6 seconds or less. A lower limit is not particularly limited, but is preferably 3.0 seconds or more, more preferably 3.5 seconds or more, further more preferably 4.0 seconds or more, particularly preferably 4.2 seconds or more, and more particularly preferably 4.4 seconds or more. In the case of first strike of the treatment solution, the time difference between the ink adhering step and the treatment solution adhering step is particularly preferably 4.5 seconds. With such a time difference, there is a tendency that the reaction between the ink and the treatment solution more easily proceeds, and color developing properties and friction fastness become more excellent.

1. 1. 3 Adhesion Method
1. 1. 3. 1 Alternate Strike

In the recording method according to the present embodiment, the treatment solution adhering step and the ink adhering step, which will be described later, are performed by an ink jet method, the ink jet method is a method in which a plurality of main scanning is performed for recording by moving the ink jet head in a direction perpendicular to a transport direction of the fabric, and the treatment solution and the ink composition may be adhered to the same scanning region of the fabric by the same main scanning, and the same main scanning is preferably performed a plurality of times on the same main scanning region.

When this is the case, alternate strike can be performed. That is, a layer containing the ink composition and the treatment solution is adhered to a certain region of the fabric by a certain main scanning, and then a layer containing the ink composition and the treatment solution can be adhered thereon by another main scanning. With this, since the treatment solution and the ink composition are alternately overlapped and laminated (overlapped in a millefeuille shape), there is a tendency that the components of both are more easily mixed and the reaction more easily proceeds, and color developing properties, friction fastness, and suppression of bleeding are more excellent.

The ink jet method is a recording method in which droplets of ink and the like are ejected from a nozzle of an ink jet head of an ink jet recording apparatus and the like and applied to a recording medium.

When the same main scanning is performed a plurality of times on the same scanning region, the main scanning for adhering the ink composition and the treatment solution passes over the same region of the fabric a plurality of times. As the number of times of scanning increases, there is a tendency that the ink or the treatment solution can be adhered to a desired region in a plurality of times (a plurality of passes), and the image quality of the obtained recorded matter is further improved.

When performing recording on any region, the number of times that the ink jet head passes over the region is also referred to as "pass". For example, when the main scanning for adhering the ink composition and the treatment solution is performed four times on the same region, the number of passes is referred to as four passes and the like. For example, in FIG. 3, when a length of one sub-scanning in a sub-scanning direction SS is one-fourth of a length of the sub-scanning direction SS of a nozzle row, four times of scanning are performed on a rectangular scanning region having a length of one sub-scanning in the sub-scanning direction SS and extending in a main scanning direction MS. The number of times of scanning when viewed in this way is referred to as the number of scanning, the number of passes, or the like. The number of times of scanning is 2 or more, preferably 3 or more, and more preferably 4 or more. In addition, the number of times of scanning is preferably 10 or less, more preferably 8 or less, further more preferably 6 or less, and particularly preferably 4 or less. According to the recording method according to the present embodiment, even when the number of times of scanning is within the above-mentioned range, there is a tendency that color developing properties, friction fastness, and suppression of bleeding are more excellent.

In addition, in the above-mentioned alternate striking, a layer containing the treatment solution may be formed by a main scanning different from the main scanning for forming the layer containing the ink composition and the treatment solution, and the layer containing the ink composition and the treatment solution and the layer containing the treatment solution may be laminated and formed. With this, by forming the layer containing the treatment solution, there is a case in which color developing properties or friction fastness is further improved. The formation of the layer containing the treatment solution may be performed before or after the formation of the layer containing the ink composition and the treatment solution, but is preferably performed before the formation.

1. 1. 3. 2 First Strike

In the recording method according to the present embodiment, the treatment solution adhering step and the ink adhering step, which will be described later, are performed by an ink jet method, the ink jet method is a method in which a plurality of main scanning is performed for recording by moving the ink jet head in a direction perpendicular to a transport direction of the fabric, and the treatment solution and the ink composition may be adhered on to the same scanning region of the fabric by different main scanning.

In such a way, first strike can be performed, and the layer containing the treatment solution and the layer containing the ink composition can be laminated and formed. In the recording method according to the present embodiment, color developing properties, friction fastness, and suppression of bleeding can become favorable even with such a first strike.

In the first strike, the order is not limited as long as the ink composition and the treatment solution are adhered by different main scanning, but in treatment solution first strike, more preferably the treatment solution is first adhered and the ink composition is adhered thereon.

In the first strike, different main scanning, in which the ink composition and the treatment solution are adhered to the scanning region, may be performed a plurality of times on the same scanning region. For example, it is considered to record the treatment solution in 4 passes and then record the ink composition in 4 passes. It should be noted that the number of passes in the first strike may be set independently for each of the ink composition and the treatment solution.

1. 1. 3. 3 Other Adhesion Method

In the above-mentioned alternate strike or first strike, a serial type ink jet head is used, but the ink adhering step and the treatment solution adhering step may be performed using a line type ink jet head.

That is, in the recording method according to the present embodiment, the treatment solution adhering step and the ink adhering step, which will be described later, are performed by an ink jet method, and in the ink jet method, one scanning may be performed on a fabric to be transported by the ink jet head using an ink jet head (line head) having a length of a recording width or more of the fabric.

In such a line type recording method, the ink composition and the treatment solution are ejected and adhered to the fabric while relatively moving positions of the line head and the fabric in the scanning direction (longitudinal direction, transport direction of the fabric) intersecting a width direction of the fabric.

1.1.4 Ink Composition

The ink composition used in the recording method according to the present embodiment contains a pigment and resin particles. Hereinafter, each component contained in the ink composition used in the recording method according to the present embodiment will be described. It should be noted that each component of the ink composition can be prepared independently of the treatment solution to be described later.

1. 1. 4. 1 Pigment

The ink composition used in the recording method according to the present embodiment contains a pigment. As the pigment, for example, an inorganic pigment or an organic pigment can be used. The pigment is a kind of coloring material. Examples of the coloring material include pigments or dyes.

The inorganic pigment is not particularly limited, and examples thereof include carbon blacks such as furnace black, lamp black, acetylene black, and channel black; and white inorganic oxides such as iron oxide, titanium oxide, zinc oxide, and silica.

Examples of carbon blacks include C.I. (Colour Index Generic Name) Pigment Black 1, 7, 11, and the like. Commercially available products may be used as the carbon blacks, for example, No. 2300, No. 900, MCF88, No. 33, No. 40, No. 45, No. 52, MA7, MA8, MA100, No. 2200B, and the like of Mitsubishi Chemical Corporation, Raven (registered trademark) 5750, 5250, 5000, 3500, 1255, and 700 of Columbian Carbon Company; Regal (registered trademark) 400R, 330R, 660R, Mogul (registered trademark) L, Monarch (registered trademark) 700, 800, 880, 900, 1000, 1100, 1300, 1400, and the like of CABOT Corporation; Color Black FW1, FW2, FW2V, FW18, FW200, S150, S160, S170, Printex (registered trademark) 35, U, V, 140U, Special Black 6, 5, 4A, and 4 of Degussa Corporation, and the like.

Examples of organic pigments include a quinacridone-based pigment, a quinacridone quinone-based pigment, a dioxazine-based pigment, a phthalocyanine-based pigment, an anthrapyrimidine-based pigment, an anthancelon-based pigment, an indanslon-based pigment, a flavanthron-based pigment, a perylene-based pigment, diketopyrrolopyrrole-based pigment, a perinone-based pigment, a quinophthalone-based pigment, an anthraquinone-based pigment, a thioindigo-based pigment, a benzoimidazolone-based pigment, an isoindolinone-based pigment, an azomethine-based pigment, or an azo-based pigment, and the like.

Specific examples of the organic pigment include the following.

Examples of the cyan pigment include C. I. Pigment Blue 1, 2, 3, 15:3, 15:4, 15:34, 16, 22, 60, and the like; C. I. Vat Blue 4, 60; and the like, and are preferably a mixture of one or two or more selected from the group consisting of C. I. Pigment Blue 15:3, 15:4, and 60.

Examples of the magenta pigment include C. I. Pigment Red 5, 7, 12, 48 (Ca), 48 (Mn), 57 (Ca), 57:1, 112, 122, 123, 168, 184, 202, C. I. Pigment Violet 19, and the like, and are preferably a mixture of one or two or more selected from the group consisting of C. I. Pigment Red 122, 202, and 209, and C. I. Pigment Violet 19.

Examples of the yellow pigment include C. I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, 185, and the like, and preferably include a mixture of one or two or more selected from the group consisting of C. I. Pigment Yellow 74, 109, 110, 128, 138, 150, and 180.

Pigments of other colors can also be used. Examples thereof include an orange pigment, a green pigment, and the like.

The pigment may be used alone, or may be used in combination of two or more.

The pigment is subjected to a surface treatment in order to enhance dispersibility in the ink composition, and in the pigment, a dispersant or the like is preferably blended.

The surface treatment of the pigment refers to a treatment to directly or indirectly bond a carbonyl group, a carboxyl group, an aldehyde group, a hydroxyl group, a sulfone group, an ammonium group, a functional group formed of salts thereof, or the like by physical or chemical treatment.

When a dispersant is blended in the ink composition, a dispersant having a hydrophobic portion (hydrophobic group) and a hydrophilic portion (hydrophilic group) in the molecular structure are preferably used. In such a dispersant, the hydrophobic portion has an action of being adsorbed on a particle surface of the pigment, and the hydrophilic portion has an action of being oriented on an aqueous medium side of the ink composition. Due to the action, there is a tendency that the pigment can be more stably contained in the ink composition as a dispersant. Such a dispersant is not particularly limited, and examples thereof include styrene-acrylic resin such as an acrylic resin, a styrene-(meth)acrylic acid copolymer, and a styrene-(meth)acrylic acid-(meth) acrate copolymer, a styrene-maleic acid-based resin, salts thereof, formalin condensates of aromatic sulfonate, and the like, and one or more selected from these groups can be adopted. A commercially available product may be used as the dispersant.

In addition, a method of coating particles of the pigment with a resin or the like to impart dispersibility may be used. As a method of coating the particles of the pigment, an acid analysis method, a phase inversion emulsification method, a mini-emulsion polymerization method, and the like can be adopted.

A content of the pigment can be appropriately adjusted depending on the intended use, and is preferably 0.1% by mass or more and 17.0% by mass or less, more preferably 0.2% by mass or more and 15.0% by mass or less, further more preferably 1.0% by mass or more and 10.0% by mass or less, and particularly preferably 2.0% by mass or more and 5.0% by mass or less with respect to the total amount of the ink composition. When the content of the pigment is within the above-mentioned range, there is a tendency that ejects performance at the time of ejection by the ink jet method can be further improved.

The ink composition may contain a dye as a coloring material other than the pigment. Examples of the dye include an acidic dye, a reactive dye, a direct dye, and the like.

1. 1. 4. 2 Resin Particles

The ink composition used in the recording method according to the present embodiment may contain resin particles. The resin particles are particles containing a resin, and are also referred to as a "resin dispersant" or a "resin emulsion".

Examples of the resin include a urethane resin, a polycarbonate resin, a (meth)acrylic resin, a styrene resin, a silicone resin, a styrene acrylic resin, a fluorene resin, a polyolefin resin, a rosin-modified resin, a terpene resin, a polyester resin, a polyamide resin, an epoxy resin, a vinyl chloride resin, a vinyl chloride-vinyl acetate copolymer, an ethylene vinyl acetate resin, and the like. These resins may be used alone, or may be used in combination of two or more.

Among these, the resin particles are preferably urethane resin, polycarbonate resin, (meth)acrylic resin, and styrene resin, more preferably urethane resin and (meth)acrylic resin, and further more preferably urethane resin. In particular, when the resin particles are urethane resin, a crosslinking agent contained in a treatment solution to be described later can react with the urethane resin, and color developing properties, friction fastness, bleeding, and the like become more favorable. It is presumed that the above reaction is a reaction between the crosslinking agent and the OH group that the urethane resin can have, but the reaction is not limited thereto.

The urethane resin is a resin having a urethane bond in the molecule. From the viewpoint of storage stability of the ink, the urethane resin is preferably an anionic urethane resin having an anionic functional group such as a carboxy group, a sulfo group, and a hydroxy group.

Examples of the urethane resin include a polyether-type urethane resin including an ether bond in the main chain, a polyester-type urethane resin including an ester bond in the main chain, and a polycarbonate-type urethane resin including a carbonate bond in the main chain, in addition to a urethane bond. A plurality of types of these urethane resins can be used in combination.

Commercially available urethane resin products include ETERNACOLL UW-1501F, UW-1527F, UW-5002 (hereinabove, product name manufactured by UBE Corporation), Takelac WS-5000, W-6061, W-6110, WS-5984, WS-5100 (hereinabove, product name manufactured by Mitsui Chemicals, Inc.), Permarin UA-150, UA-200, U-coat UX-390 (hereinabove, product name manufactured by Sanyo Chemical Industries, Ltd.), Hydran WLS-210 (product name manufactured by DIC Corporation), and the like.

The polycarbonate resin is a resin having a polycarbonate bond in the molecule. When a urethane resin is not used, a polycarbonate resin is preferably used instead.

Examples of commercially available products of the (meth)acrylic resin include Movinyl 966A and 6760 (product names manufactured by Nippon Synthetic Chemical Industry Co., Ltd.), which are acrylic resins.

The (meth)acrylic resin means a resin having a (meth) acrylic skeleton. The (meth)acrylic resin is not particularly limited, and for example, a polymer of a (meth)acrylic monomer such as (meth)acrylic acid and (meth)acrylic acid ester, or a copolymer of a (meth)acrylic monomer and other monomer. Examples of the other monomer include a vinyl-based monomer such as styrene. In addition, in the present specification, "(meth)acrylic" is a concept including both "methacrylic" and "acrylic".

Examples of commercially available silicone resin products include POLON-MF014, POLON-MF-18T, POLON-MF-33, KM-2002-T (hereinabove, product names manufactured by Shin-Etsu Silicone Co., Ltd.), WACKER FINISH WR1100, NP2406, POWERSOFT FE 55, and TS2406 (hereinabove, product name manufactured by Asahi Kasei Corporation).

An acid value of the resin contained in the resin particles is not particularly limited, but is preferably 1 to 300 KOH mg/g, more preferably 10 to 200 KOH mg/g, and further more preferably 20 to 100 KOH mg/g.

A content of the resin particles is preferably 1.0% by mass or more, more preferably 2.0 to 20% by mass, and further more preferably 3.0 to 10% by mass in terms of solid content with respect to the total amount of the ink composition. When the content of the resin particles is within the above-mentioned range, there is a tendency that it is possible to obtain a recorded material having excellent color developing properties and excellent friction fastness.

1. 1. 4. 3 Water

The ink composition used in a recording method according to the present embodiment may contain water. As such water, the same water that can be contained in the treatment solution to be described later can be used, and the content can be the same.

1. 1. 4. 4 Organic Solvent

The ink composition used in the recording method according to the present embodiment may contain an organic solvent. As such an organic solvent, the same organic solvent as that contained in the treatment solution to be described later can be used.

The ink composition preferably contains an organic solvent having a standard boiling point of more than 280° C. among the organic solvents. Examples of the organic solvent having a standard boiling point of more than 280° C. include glycerin, polyethylene glycol monomethyl ether, and the like, and glycerin is more preferable. A lower limit value of the content of the organic solvent having a standard boiling point of more than 280° C. is preferably 1% by mass or more, more preferably 3% by mass or more, further more preferably 5% by mass or more, and particularly preferably 7% by mass or more with respect to the total amount of the ink composition. An upper limit value of the content of the organic solvent having a standard boiling point of more than 280° C. is preferably 30% by mass or less, further more preferably 25% by mass or less, particularly preferably 20% by mass or less, and more particularly preferably 15% by mass or less with respect to the total amount of the ink composition.

A lower limit value of the content of the organic solvent is preferably 1% by mass or more, more preferably 5% by mass or more, further more preferably 10% by mass or more, and particularly preferably 15% by mass or more with respect to the total amount of the ink composition. In addition, the upper limit value of the content of the organic solvent is preferably 40% by mass or less, more preferably 35% by mass or less, particularly preferably 30% by mass or less, and more particularly preferably 25% by mass or less with respect to the total amount of the ink composition.

1. 1. 4. 5 Surfactant

The ink composition used in the recording method according to the present embodiment may contain a surfactant. As such a surfactant, the same surfactant as that contained in the treatment solution to be described later can be used, and the content can be the same.

1. 1. 4. 6 pH Regulator

The ink composition used in the recording method according to the present embodiment may contain a pH regulator. The pH regulator is not particularly limited, and examples thereof include an appropriate combination of acid, base, weak acid, and weak base. Examples of acids and bases used in such combination include sulfuric acid, hydrochloric acid, nitric acid and the like as inorganic acid; lithium hydroxide, sodium hydroxide, potassium hydroxide, potassium dihydrogen phosphate, disodium hydrogen phosphate, potassium carbonate, sodium carbonate, sodium hydrogen carbonate, ammonia, and the like as inorganic base; triethanolamine, diethanolamine, monoethanolamine, tripropanolamine, triisopropanolamine, diisopropanolamine, trishydroxy methylaminomethane (THAM), and the like as organic base; good buffer such as adipic acid, citric acid, succinic acid, lactic acid, N, N-bis(2-hydroxyethyl)-2-aminoethanesulfonic acid (BES), 4-(2-hydroxyethyl)-1-piperazineethanesulfonic acid (HEPES), morpholinoethanesulfonic acid (MES), carbamoylmethyliminobisacetic acid (ADA), piperazine-1, 4-bis(2-ethanesulfonic acid) (PIPES), N-(2-acetamide)-2-aminoethanesulfonic acid (ACES), coramine hydrochloride, N-tris(hydroxylmethyl)methyl-2-aminoethanesulfonic acid (TES), acetoamide glycine, tricin, glycineamide, bicin, and the like, phosphate buffer, citrate buffer, tris buffer, and the like as organic acid, and the like.

As the ink composition, the pH regulator may be used alone, or may be used in combination of two or more. In addition, a total content of the ink composition with respect to the total mass when the pH regulator is used is, for example, 0.05% by mass or more and 3.0% by mass or less, and preferably 0.1% by mass or more and 1.0% by mass or less.

1. 1. 4. 7 Other Components

The ink composition used in the recording method according to the present embodiment can appropriately contain various additives, as components other than the above, such as a lubricant, a softening agent, a solubilizing agent, a viscosity modifier, a moisturizing agent such as glycerin, an antioxidant, an antiseptic agent/antifungal agent such as Proxel XL2 (product name manufactured by Arch Chemicals Inc.), a corrosion inhibitor, a chelating agent for capturing metal ions that affect dispersion (for example, sodium ethylenediamine tetraacetate), and the like. Among the above, those which are also organic solvents such as glycerin are also included in the above-mentioned organic solvents.

1. 1. 4. 8 Manufacturing and Physical Properties of Ink Composition

The ink composition used in the recording method according to the present embodiment is obtained by mixing the above-described components in any order and, depending on the necessity, filtering or the like to remove impurities. As a method of mixing each component, a method of sequentially adding materials to a container equipped with a stirring device such as a mechanical stirrer and a magnetic stirrer, and performing stirring and mixing is appropriately used.

The ink composition used in the recording method according to the present embodiment preferably has a surface tension of 20 to 40 mN/m, and more preferably has 22 to 35 mN/m from the viewpoint of reliability when ejected by an ink jet method. In addition, from the same viewpoint, the viscosity of the ink composition at 20° C. is preferably 1.5 to 10 mPa·s, more preferably 8 mPa·s or less, and further more preferably 2 to 8 mPa·s. In order to maintain the surface tension and the viscosity within the above-mentioned range, the types of the above-mentioned organic solvent and surfactant, the addition amount of these and water, and the like may be appropriately adjusted.

1. 2 Treatment Solution Adhering Step

The recording method according to the present embodiment includes a treatment solution adhering step of adhering droplets of the treatment solution containing a crosslinking agent to the fabric.

1. 2. 1 Droplet Weight of Treatment Solution

In the recording method according to the present embodiment, the maximum weight per droplet of the droplet of the treatment solution is 30 ng or less, and the droplet weight of the treatment solution is equal to or less than the droplet weight of the above-mentioned ink composition.

The maximum weight per droplet of the droplet of the treatment solution is preferably 27 ng or less, more preferably 24 ng or less, further more preferably 21 ng or less, even more preferably 18 ng or less, particularly preferably 15 ng or less, and more particularly preferably 12 ng or less. A lower limit of the maximum weight per droplet of the droplet of the treatment solution is not particularly limited, but is preferably 1 ng or more, more preferably 4 ng or more, further more preferably 7 ng or more, and particularly preferably 10 ng or more. When the maximum weight per droplet of the droplet of the treatment solution is within the above range, particularly 11 ng, there is a case where the ink and the treatment solution are more easily mixed, and color developing properties and friction fastness may be further improved.

As described above, the droplet weight of the treatment solution is equal to or less than the droplet weight of the ink composition, and preferably the droplet weight of the treatment solution is smaller than the droplet weight of the ink composition.

In addition, an adhesion amount of the treatment solution is preferably 10 to 21 mg/inch$^2$, more preferably 12 to 20 mg/inch$^2$, and further more preferably 14 to 19 mg/inch$^2$, and particularly preferably 15 to 18 mg/inch$^2$ per unit area of the recording region of the fabric.

1. 2. 2 Step Interval

As described above, in the recording method according to the present embodiment, the time difference between the above-mentioned ink adhering step and the treatment solution adhering step is preferably within 5 seconds. The preferable time difference in the case of the alternate strike or the treatment solution first strike is as described above, and the description thereof will be omitted.

1. 2. 3 Adhesion Method

As described above, the recording method according to the present embodiment preferably performs alternate strike, and may perform first strike or an ink adhering step and a treatment solution adhering step by using a line type ink jet head.

1. 2. 4 Treatment Solution

The treatment solution used in the recording method according to the present embodiment contains a crosslinking agent. Hereinafter, each component contained in the treatment solution used in the recording method according to the present embodiment will be described.

The treatment solution is not the above-mentioned ink composition used for performing coloring on the fabric, but an auxiliary solution used together with the above-mentioned ink composition. In addition, the treatment solution preferably aggregates or thickens the components of the ink composition, and more preferably contains a component that aggregates or thickens the components of the ink composition. The treatment solution may contain the coloring material, but is preferably 0.2% by mass or less, more preferably 0.1% by mass or less, and further more preferably 0.05% by mass or less with respect to a total amount of the treatment solution, and a lower limit is 0% by mass. The treatment solution preferably does not contain a coloring material.

1. 2. 4. 1 Crosslinking Agent

The treatment solution used in the recording method according to the present embodiment contains a crosslinking agent. As the crosslinking agent, any compound which has a crosslinking group and is capable of causing a crosslinking reaction may be used, and known ones can be used. The crosslinking agent is preferably a crosslinking agent that reacts with a hydroxyl group. Such a crosslinking agent causes crosslinking reaction with a hydroxyl group that can be contained in the resin particles contained in the ink composition, the ink is more easily thickened and aggregated, color developing properties can be further improved, the ink layer is toughened by crosslinking of the resin, and thus more favorable friction fastness can be obtained. In addition, when the fabric is cotton or the like, crosslinking reaction occurs between the crosslinking agent that reacts with a hydroxyl group and a hydroxyl group of cellulose of cotton, adhesive properties between the fabric and the ink layer are further improved, and more favorable friction fastness can be obtained.

In addition, the crosslinking agent is preferably cationic. When the crosslinking agent is cationic, anionic components (usually pigments, resin particles, or the like) in the ink composition can be aggregated. With this, color developing properties can be further improved.

The crosslinking agent is preferably, for example, one or more selected from polyamide epichlorohydrin resin, polyamine epichlorohydrin resin, melamine resin, and blocked isocyanate resin. Among these, the crosslinking agent is preferably a polyamide epichlorohydrin resin. When such a crosslinking agent is used, there is a tendency in which friction fastness and color developing properties are more excellent.

The polyamide epichlorohydrin resin is a polymer obtained by, for example, a method of subjecting polyamide to epichlorohydrin in an addition reaction or a method of polymerizing a monomer containing an amine, a carboxylic acid and epichlorohydrin. The polyamide polyamine-epichlorohydrin copolymer is included in the polyamide epichlorohydrin resin. Commercially available products of polyamide epichlorohydrin resin include Kymene557 (manufactured by SOLENIS), WS-4020, 4030, 4027, TS-4070 (manufactured by Seiko PMC Corporation), AF-100, 251S, 255, 255LOX, 2500 (manufactured by Arakawa Chemical Industries, Ltd.), and the like. These are cationic crosslinking agents.

The polyamine epichlorohydrin resin is a polymer obtained by, for example, a method of subjecting polyamine to epichlorohydrin in an addition reaction or a method of polymerizing a monomer containing an amine such as dimethylamine and epichlorohydrin. Examples of commercially available products of polyamine epichlorohydrin resin include Unisense KHE107L (manufactured by Senka Co. Ltd.) and WS-4011 (manufactured by Seiko PMC Corporation). These are cationic crosslinking agents.

Examples of the melamine resin include butylated melamine, fully etherified melamine, and the like. The melamine resin is preferably water-soluble. Examples of commercially available melamine resin products include Milliogen P-20 (manufactured by Senka Co. Ltd.), Sumirez (registered trademark) Resin 8% AC (manufactured by Taoka Chemical Company Ltd.), and the like. These are cationic crosslinking agents.

The blocked isocyanate resin is a resin having an isocyanate group inactivated by a blocking agent. When the blocked isocyanate resin is heated at a temperature equal to or higher than the crosslinking reaction start temperature, the blocked isocyanate resin reacts with a hydroxyl group that the resin particles can have to form a urethane bond. This is because the blocking agent inactivating the isocyanate groups of the blocked isocyanate resin is dissociated by being heated to a predetermined temperature, the isocyanate groups are activated, and the crosslinking reaction proceeds. As the blocked isocyanate resin, TMP (trimethylolpropane) adduct or isocyanurate of HDI (hexamethylene diisocyanate), H6XDI (hydrogenated xylylene diisocyanate), IPDI (isophorone diisocyanate) or H12MDI (dicyclohexylmethane diisocyanate) is preferably blocked. Examples of commercially available blocked isocyanate resins include Fixer #220 (manufactured by Murayama Chemical Co., Ltd.), SU-268A (manufactured by Meisei Chemical Works, Ltd.), MF-B60B (manufactured by Asahi Kasei Corporation), and the like.

A mass average molecular weight of the crosslinking agent is preferably 100,000 or less, more preferably 80,000 or less, further more preferably 60,000 or less, particularly preferably 40,000 or less, and more particularly preferably 20,000 or less. A lower limit of the mass average molecular weight of the crosslinking agent is not particularly limited, but is preferably 100 or more, more preferably 1,000 or more, and further more preferably 5,000 or more. When the mass average molecular weight of the crosslinking agent is 100,000 or less, there is a tendency that the ejection performance when the treatment solution is applied by the ink jet method becomes more favorable. The mass average molecular weight can be measured using polyethylene glycol as a standard polymer by using gel permeation chromatography (GPC measuring apparatus).

A content of the crosslinking agent is preferably 1 to 10% by mass, more preferably 3 to 9% by mass, further more preferably 4 to 8% by mass, particularly preferably 5 to 7% by mass, and more particularly preferably 6 to 7% by mass with respect to the total amount of the treatment solution. When the content of the crosslinking agent is within the above-mentioned range, there is a tendency that the balance between print quality such as friction fastness, color developing properties, and bleeding and ejection performance when the treatment solution is applied by the ink jet method can be improved.

1. 2. 4. 2 Polyvalent Metal Salt

The treatment solution used in the recording method according to the present embodiment preferably further contains a polyvalent metal salt. The polyvalent metal salt has excellent reactivity with components in the ink, and color developing properties can be further improved by being used with the above-mentioned crosslinking agent.

The polyvalent metal salt is a compound that is soluble in water and is formed of a divalent or higher polyvalent metal ions and an anion bonded to these polyvalent metal ions. Specific examples of the polyvalent metal ion include divalent metal ions such as $Ca^{2+}$, $Cu^{2+}$, $Ni^{2+}$, $Mg^{2+}$, $Zn^{2+}$, and $Ba^{2+}$; and trivalent metal ions such as $Al^{3+}$, $Fe^{3+}$, and $Cr^{3+}$. Examples of anions include $Cl^-$, $I^-$, $Br^-$, $SO_4^{2-}$, $ClO_3^-$, $NO^{3-}$, $HCOO^-$, $CH_3COO^-$, and the like. Among these polyvalent metal salts, calcium salt and magnesium salt are preferable from a viewpoint of stability of the treatment solution and reactivity as a coagulant, and magnesium salt is more preferable from a viewpoint of the balance between reactivity and friction fastness.

When the polyvalent metal salt is contained, a lower limit of the content of the polyvalent metal salt is preferably 0.5% by mass or more, more preferably 1% by mass or more, further more preferably 1.5% by mass or more, and particularly preferably 2.0% by mass or more with respect to the total amount of the treatment solution. In addition, an upper limit of the content of the polyvalent metal salt is preferably 20% by mass or less, more preferably 15% by mass or less, further more preferably 10% by mass or less, even more preferably 5% by mass or less, particularly preferably 4% by mass or less, and more particularly preferably 3% by mass or less with respect to the total amount of the treatment solution.

1. 2. 4. 3 Other Coagulant

The treatment solution used in the recording method according to the present embodiment may contain components obtained by aggregating or thickening the components of the ink composition, in addition to the above-mentioned crosslinking agent and polyvalent metal salt. Examples of such a component include an organic acid, a cationic resin having no crosslinkability, and the like.

Examples of appropriate organic acids include phosphoric acid, polyacrylic acid, acetic acid, glycolic acid, malonic acid, malic acid, maleic acid, ascorbic acid, succinic acid, glutaric acid, fumaric acid, citric acid, tartrate acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumarin acid, thiophene carboxylic acid, nicotinic acid, derivatives of these compounds, or salts thereof. The organic acid may be used alone or in combination of two or more. In addition, a salt of an organic acid which is also a polyvalent metal salt is included in the polyvalent metal salt.

Examples of the cationic resin include a cationic urethane-based resin, a cationic olefin-based resin, a cationic amine-based resin, and the like. The cationic amine-based resin may be any resin having an amino group, and examples thereof include an allylamine resin, a polyamine resin, a quaternary ammonium salt polymer, a polyamide resin, and the like. However, unlike the above-mentioned crosslinking agent, these resins do not have a crosslinking group. Examples of the polyamine resin include those having an amino group in the main skeleton of the resin. Examples of the allylamine resin include those having a structure derived from an allyl group in the main skeleton of the resin. Examples of the quaternary ammonium salt polymer include a resin having a quaternary ammonium salt in the structure. Examples of the polyamide resin include those having an amide group in the main skeleton of the resin and an amino group in the side chain of the resin. Among the cationic resins, the cationic resin is preferably a cationic amine-based resin because the resin has excellent reactivity and is also easily available.

1. 2. 4. 4 Water

The treatment solution used in the recording method according to the present embodiment may contain water. Examples of water include pure water such as ion-exchanged water, ultra-filtered water, reverse osmosis water, and water having reduced ionic impurities such as ultrapure water. In addition, when water sterilized by irradiation with ultraviolet rays or addition of hydrogen peroxide or the like is used, it is possible to suppress generation of bacteria or fungi when the treatment solution is stored for a long period of time.

The water content is preferably 30% by mass or more, more preferably 40% by mass or more, further more preferably 45% by mass or more, even more preferably 50% by mass or more, particularly preferably 55% by mass or more, and more particularly preferably 60% by mass or more with respect to the total amount of the treatment solution. Since the water content is within the above-mentioned range, it is possible to maintain the treatment solution at a relatively low viscosity. In addition, an upper limit of the water content is preferably 90% by mass or less, more preferably 85% by mass or less, and further more preferably 80% by mass or less with respect to the total amount of the treatment solution.

1. 2. 4. 5 Organic Solvent

The treatment solution used in the recording method according to the present embodiment may contain an organic solvent. In addition, the organic solvent is preferably water-soluble. The water-soluble means that water and an organic solvent are mixed at room temperature at a mass ratio of 1:1 and stirred, and then separation or cloudiness cannot be confirmed.

Examples of the organic solvent include esters, alkylene glycol ethers, cyclic esters, nitrogen-containing solvents, polyhydric alcohols, and the like. Examples of the nitrogen-containing solvent include cyclic amides, acyclic amides, and the like. Examples of the acyclic amides include alkoxyalkylamides and the like.

Examples of esters include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, methoxybutyl acetate; glycol diesters such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, dipropylene glycol acetate propionate, and the like.

The alkylene glycol ethers may be alkylene glycol monoethers or diethers, and alkyl ethers are preferable. Specific examples include alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether (BTG), tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monobutyl ether; alkylene glycol dialkyl ethers such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, tripropylene glycol dimethyl ether; and the like.

Examples of cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, δ-octanolactone, δ-nonalactone, ε-nonalactone, and ε-decanolactone; compounds in which a hydrogen of a methylene group adjacent to the carbonyl group is substituted with an alkyl group having 1 to 4 carbon atoms, and the like.

Examples of alkoxyalkylamides include 3-methoxy-N, N-dimethylpropionamide, 3-methoxy-N, N-diethylpropionamide, 3-methoxy-N, N-methylethylpropionamide, 3-ethoxy-N, N-dimethylpropionamide, 3-ethoxy-N, N-diethylpropionamide, 3-ethoxy-N, N-methylethylpropionamide, 3-n-butoxy-N, N-dimethylpropionamide, 3-n-butoxy-N, N-diethylpropionamide, 3-n-butoxy-N, N-methylethylpropionamide, 3-n-propoxy-N, N-dimethylpropionamide, 3-n-propoxy-N, N-diethylpropionamide, 3-n-propoxy-N, N-methylethylpropionamide, 3-iso-propoxy-N, N-dimethylpropionamide, 3-iso-propoxy-N, N-diethylpropionamide, 3-iso-propoxy-N, N-methylethylpropionamide, 3-tert-butoxy-N, N-dimethylpropionamide, 3-tert-butoxy-N, N-diethylpropionamide, 3-tert-butoxy-N, N-methylethylpropionamide, and the like.

Examples of cyclic amides include lactams, and examples thereof include pyrrolidones such as 2-pyrrolidone, 1-methyl-2-pyrrolidone, 1-ethyl-2-pyrrolidone, 1-propyl-2-pyrrolidone, 1-butyl-2-pyrrolidone, and the like.

Examples of the polyhydric alcohol include 1,2-alkanediol (for example, alkanediols such as ethylene glycol, propylene glycol (also known as propane-1,2-diol), 1,2-butanediol, 1,2-pentanediol, 1,2-hexanediol, 1,2-heptanediol, 1,2-octanediol), polyhydric alcohols (polyols) excluding 1,2-alkanediol (for example, diethylene glycol, dipropylene glycol, triethylene glycol (TEG), 1,3-propanediol, 1,3-butanediol (also known as 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, glycerin, and the like), and the like.

The organic solvent may be used alone, or may be used in combination of two or more.

Among the above-exemplified organic solvents, the treatment solution preferably contains an organic solvent having a standard boiling point of more than 280° C. Examples of the organic solvent having a standard boiling point of more than 280° C. include glycerin, polyethylene glycol monomethyl ether, and the like, and glycerin is more preferable. A lower limit value of the content of the organic solvent having a standard boiling point of more than 280° C. is preferably 1% by mass or more, more preferably 5% by mass or more, further more preferably 10% by mass or more, and particularly preferably 15% by mass or more with respect to the total amount of the treatment solution. An upper limit value of the content of the organic solvent having a standard boiling point of more than 280° C. is preferably 40% by mass or less, more preferably 35% by mass or less, particularly preferably 30% by mass or less, and more particularly preferably 25% by mass or less with respect to the total amount of the treatment solution.

The lower limit value of the content of the organic solvent is preferably 1% by mass or more, more preferably 5% by mass or more, and further more preferably 10% by mass or more, and particularly preferably 15% by mass or more with respect to the total amount of the treatment solution. The upper limit value of the content of the organic solvent is preferably 40% by mass or less, more preferably 35% by mass or less, particularly preferably 30% by mass or less, and more particularly preferably 25% by mass or less with respect to the total amount of the treatment solution.

1. 2. 4. 6 Surfactant

The treatment solution used in the recording method according to the present embodiment may contain a surfactant. The surfactant is not particularly limited, examples thereof include an acetylene glycol-based surfactant, a fluorine-based surfactant, and a silicone-based surfactant, and the surfactant preferably contains at least one of these, and among these, more preferably contains an acetylene glycol-based surfactant.

The acetylene glycol-based surfactant is not particularly limited, and examples thereof include Surfinol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF110D (hereinabove, all product names, manufactured by Air Products Japan Inc.), Orfin B, Y, P, A, STG, SPC, E1004, E1010, PD-001, PD-002W, PD-003, PD-004, EXP. 4001, EXP. 4036, EXP. 4051, AF-103, AF-104, AK-02, SK-14, AE-3 (hereinabove, all product names, manufactured by Nissin Chemical Industry Co., Ltd.), acetylenol E00, E00P, E40, E100 (hereinabove, all product names, manufactured by Kawaken Fine Chemicals Co., Ltd.), and the like.

The silicone-based surfactant is not particularly limited, and examples thereof preferably include a polysiloxane-based compound. The polysiloxane-based compound is not particularly limited, and examples thereof include polyether-modified organosiloxane. Examples of commercially available products of the polyether-modified organosiloxane include BYK-306, BYK-307, BYK-333, BYK-341, BYK-345, BYK-346, and BYK-348 (hereinabove, all product names, manufactured by BYK Chemie Japan Co., Ltd.), KF-351A, KF-352A, KF-353, KF-354L, KF-355A, KF-615A, KF-945, KF-640, KF-642, KF-643, KF-6020, X-22-4515, KF-6011, KF-6012, KF-6015, KF-6017 (hereinabove, all product names, manufactured by Shin-Etsu Chemical Co., Ltd.), and the like.

As the fluorine-based surfactant, a fluorine-modified polymer is preferably used, and specific examples thereof include BYK-340 (product name, manufactured by BYK Chemie Japan Co., Ltd.).

When a surfactant is contained, a content thereof can be 0.1% by mass or more and 1.5% by mass or less with respect to the total amount of the treatment solution, and is preferably 0.5% by mass or more and 1% by mass or less.

1. 2. 4. 7 Antiseptic Agent/Antifungal Agent

The treatment solution used in the recording method according to the present embodiment may contain an antiseptic agent/antifungal agent. Examples of the antiseptic agent/antifungal agent include sodium benzoate, sodium pentachlorophenol, sodium 2-pyridinethiol-1-oxide, sodium sorbate, sodium dehydroacetate, Proxel CRL, Proxel BDN, Proxel GXL, Proxel XL-2, Proxel IB, Proxel TN (all manufactured by Ronza Japan Co., Ltd., product name), 4-chloro-3-methylphenol (Preventol CMK manufactured by Bayer Co., Ltd. and the like), and the like.

When the antiseptic agent/antifungal agent is contained, a content thereof can be, for example, 0.05% by mass or more and 1.0% by mass or less, and is preferably 0.1% by mass or more and 0.5% by mass or less with respect to the total amount of the treatment solution.

1. 2. 4. 8 Other Components

The treatment solution used in the recording method according to the present embodiment can appropriately contain various additives, as components other than the above, such as a softening agent, a solubilizing agent, a viscosity modifier, a pH regulator such as triethanolamine, a moisturizing agent such as glycerin, an antioxidant, a corrosion inhibitor, a chelating agent for capturing metal ions that affect dispersion (for example, sodium ethylenediamine tetraacetate), and the like. Among the above, those which are also organic solvents such as glycerin are also included in the above-mentioned organic solvents.

1. 2. 4. 9 Manufacture and Physical Properties of Treatment Solution

The treatment solution used in the recording method according to the present embodiment is obtained by mixing the above-mentioned components in any order and performing filtering or the like depending on the necessity to remove impurities. As a method of mixing each component, a method of sequentially adding materials to a container equipped with a stirring device such as a mechanical stirrer and a magnetic stirrer, and performing stirring and mixing is appropriately used.

The treatment solution used in the recording method according to the present embodiment preferably has a surface tension of 20 to 40 mN/m, and more preferably 22 to 35 mN/m from the viewpoint of reliability when ejected by an ink jet method. In addition, from the same viewpoint, the viscosity of the treatment solution at 20° C. is preferably 1.5 to 10 mPa·s, more preferably 8 mPa·s or less, and further more preferably 2 to 8 mPa·s. In order to maintain the surface tension and the viscosity within the above-mentioned range, the types of the above-mentioned organic solvent and surfactant, the addition amount of these and water, and the like may be appropriately adjusted.

1. 3 Other Steps

The recording method according to the present embodiment may include a step of heating the ink and the like adhered to the fabric after the above-mentioned ink adhering step and the treatment solution adhering step. The heating method is not particularly limited, and examples thereof include a heat press method, a normal pressure steam method, a high pressure steam method, a thermofix method, and the like. A heat source at the time of heating is not particularly limited, but for example, an infrared lamp and the like can be used. A heating temperature is preferably a temperature at which resin particles of the ink are fused and the medium such as moisture volatilizes. For example, the heating temperature is preferably about 100° C. or higher and about 200° C. or lower, more preferably 170° C. or lower, and further more preferably 160° C. or lower. Here, the heating temperature in the heating step refers to a surface temperature of an image and the like formed on the fabric. The time for performing heating is not particularly limited, and is, for example, 30 seconds or more and 20 minutes or less.

After the heating step, a step of washing the printed fabric with water and drying thereof may be provided. In washing with water, depending on the necessity, as a soaping treatment, components such as ink that was not fixed on the fabric may be washed away using a hot soap solution and the like.

1. 4 Ink Jet Printing Apparatus

An example of an ink jet printing apparatus including an ink jet head, which can be applied to the recording method according to the present embodiment, will be described with reference to FIG. 1.

The ink jet printing apparatus used in the following description is a serial printer in which an ink jet head for recording is mounted on a carriage that moves in a predetermined direction, and the ink jet head moves with the movement of the carriage to eject droplets to the fabric. The ink jet printing apparatus that can be applied to the recording method according to the present embodiment is not limited to a serial printer, and may be a line printer. A line printer is a type of printer in which an ink jet head is formed to be wider than a width of a fabric, and droplets are ejected to the fabric without the ink jet head moving.

The ink jet printing apparatus is an apparatus for printing by landing droplets on a fabric by an ink jet head as a liquid ejection portion that ejects minute droplets of an ink composition or a treatment solution. FIG. 1 is a schematic perspective view showing an ink jet printing apparatus used in the embodiment.

As shown in FIG. 1, a printer 1 in the present embodiment includes an ink jet head 3, a carriage 4, a main scanning mechanism 5, a platen roller 6, and a control portion (not shown) that controls operation of the entire printer 1. The carriage 4 is equipped with the ink jet head 3, and liquid cartridges 7a, 7b, 7c, 7d, 7e, and 7f for storing an ink composition and a treatment solution supplied to the ink jet head 3 are detachable.

The main scanning mechanism 5 includes a timing belt 8 coupled to the carriage 4, a motor 9 for driving the timing belt 8, and a guide shaft 10. The guide shaft 10 is installed as a support member for the carriage 4 in a scanning direction of the carriage 4, that is, in a main scanning direction MS. The carriage 4 is driven by the motor 9 via the timing belt 8 and can reciprocate along the guide shaft 10. With this, the main scanning mechanism 5 has a function of reciprocating the carriage 4 in the main scanning direction MS.

The platen roller 6 has a function of transporting a fabric 2 to be printed in a sub-scanning direction SS orthogonal to the main scanning direction MS, that is, in a length direction of the fabric 2. With this, the fabric 2 is transported in the sub-scanning direction SS. The carriage 4 equipped with the ink jet head 3 can reciprocate in the main scanning direction MS which substantially coincides with a width direction of the fabric 2, and the ink jet head 3 is configured so that the fabric 2 can be scanned relatively in the main scanning direction MS and the sub-scanning direction SS.

The liquid cartridges 7a, 7b, 7c, 7d, 7e, and 7f are six independent liquid cartridges. The liquid cartridges 7a, 7b, 7c, 7d, 7e, and 7f can store the ink composition and the treatment solution used in the recording method in the present embodiment. In these liquid cartridges, the ink composition and the treatment solution exhibiting colors such as black, cyan, magenta, yellow, white, and orange are individually stored, and can be used in any combination. In FIG. 1, the number of liquid cartridges is set to 6, but the number is not limited thereto. At the bottom of the liquid cartridges 7a, 7b, 7c, 7d, 7e, and 7f, there are provided supply ports (not shown) for supplying the ink composition or treatment solution stored in each liquid cartridge to the ink jet head 3.

The ink jet head 3 is a unit that sprays the ink composition and the treatment solution supplied from the liquid cartridges 7a, 7b, 7c, 7d, 7e, and 7f from a plurality of nozzles to the fabric 2 under control by a control portion (not shown) and adhering thereof. The ink jet head 3 is provided with the plurality of nozzles for ejecting the ink composition and the treatment solution and adhering thereof to the fabric 2 on a surface opposing the fabric 2 to which the ink composition and the treatment solution are adhered. The plurality of nozzles are disposed in a row to form a nozzle row, and the nozzle row is individually disposed corresponding to each color ink composition and treatment solution. Each color ink composition and treatment solution are supplied to the ink jet head 3 from each liquid cartridge, and are ejected as droplets from a nozzle by an actuator (not shown) in the ink jet head 3. When the ejected droplets of the ink composition and the treatment solution land on the fabric 2, and adhesion treatment on the fabric 2 is performed, an image, a text, a pattern, a color, and the like using the ink are formed on a printing region of the fabric 2. A plurality of the ink jet heads 3 may be provided in the carriage 4.

Here, in the ink jet head 3, a piezoelectric element is used as an actuator which is a driving unit, but the method is not limited thereto. For example, an electromechanical conversion element that displaces a diaphragm as an actuator by electrostatic adsorption, or an electrothermal conversion element that ejects an ink composition as droplets by air bubbles generated by heating may be used.

The ink jet head 3 has a nozzle group for treatment solution for ejecting a treatment solution and a nozzle group for ink composition for ejecting an ink composition. The nozzle group from which ejection is performed means a nozzle group used for recording in the recording method. When there is an image to be temporarily recorded on a region of the fabric opposing the nozzle group at a time of performing the main scanning, the nozzle group is a nozzle group for ejecting an ink and the like from the nozzle, and a nozzle group continuous in the sub-scanning direction SS. Therefore, although the nozzle group itself exists, the nozzle group not used for recording in the recording method is not included in the nozzle group from which ejection is performed.

Figure 2:
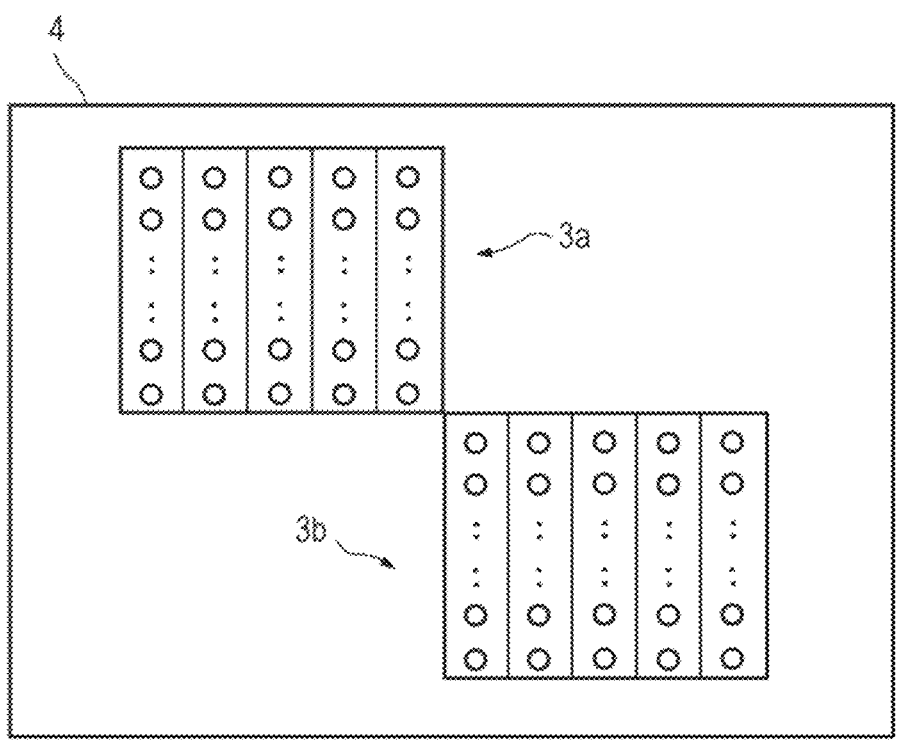
FIG. 2 is a schematic diagram showing an example of disposing of an ink jet head of an ink jet printing apparatus.
Figure 2:
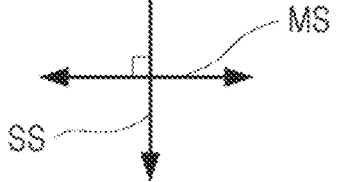
Figure 3:
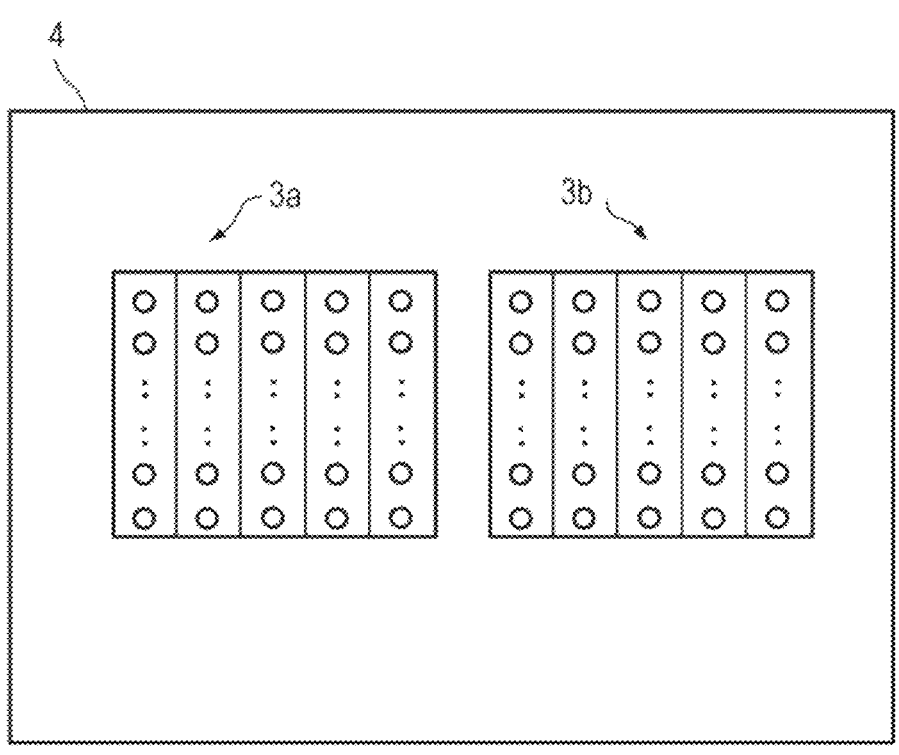
FIG. 3 is a schematic diagram showing an example of disposing of an ink jet head of an ink jet printing apparatus.
Figure 3:
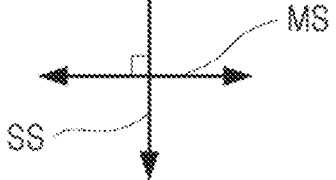
Figure 4:
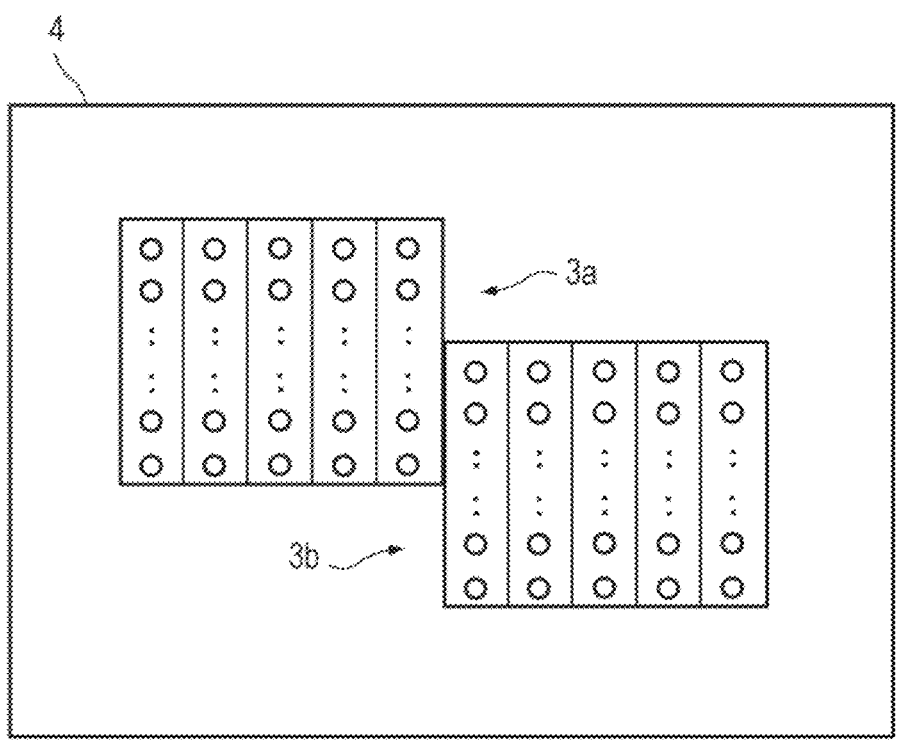
FIG. 4 is a schematic diagram showing an example of disposing of an ink jet head of an ink jet printing apparatus.
Figure 4:
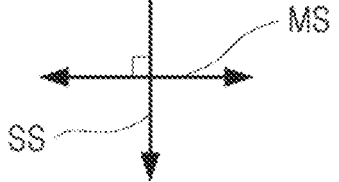

FIGS. 2, 3, and 4 show an example of disposing of a head of the ink jet head 3. In FIG. 2, an ink jet head 3a and an ink jet head 3b are disposed from an upstream to a downstream in the transport direction (sub-scanning direction SS). In addition, in FIG. 3, the ink jet head 3a and the ink jet head 3b are disposed at the same position in the sub-scanning direction SS, and are disposed side by side. In addition, in FIG. 4, the ink jet head 3a and the ink jet head 3b are disposed from the upstream to the downstream in the transport direction (sub-scanning direction SS), having portions overlapping each other.

In the recording method according to the present embodiment, the ink jet head 3 preferably has a configuration in which a nozzle group for treatment solution used for recording is provided upstream of or in an overlapping portion of the nozzle group for ink composition used for recording in the transport direction of the fabric. In addition, from the same viewpoint, preferably the head that ejects a treatment solution is positioned at the same position as that of the head that ejects the ink composition with respect to the transport direction of the fabric, or is positioned upstream of the head that ejects the ink composition in the transport direction of the fabric. With such a configuration, droplets can be adhered by alternate strike or treatment solution first strike, and components of the ink composition and the treatment solution are more easily mixed and the reaction more easily proceeds, and thus there is a tendency that color developing properties, friction fastness, and suppression of bleeding are more excellent.

For example, in an example of FIG. 2, by using the ink jet head 3a as a head that ejects a treatment solution and the ink jet head 3b as a head that ejects an ink composition, the nozzle group for treatment solution used for recording can be on provided upstream of the nozzle group for ink composition used for recording in the transport direction (sub-scanning direction SS) of the fabric. In such a case, the treatment solution is adhered to the fabric before the ink composition. That is, the treatment solution first strike can be performed, a layer containing the treatment solution can be formed, and then a layer containing the ink composition can be laminated and formed.

For example, in an example of FIG. 3, when the ink jet head 3a is used as a head that ejects a treatment solution, the ink jet head 3b is used as a head that ejects an ink composition, and a portion at which a nozzle group for treatment solution used for recording and a nozzle group for ink composition used for recording overlap with each other is included, alternate strike can be performed. That is, lamination in which the treatment solution and the ink composition alternately overlap with each other (millefeuille shaped lamination) is possible.

The "overlapping portion" refers to a portion positioned at the same position in the sub-scanning direction SS, among the nozzle group for ink composition used for recording and the nozzle group for treatment solution used for recording. With this, the ink composition and the treatment solution are overlapped and adhered to the fabric by the same main scanning.

For example, in an example of FIG. 4, when the ink jet head 3*a* is used as a head that ejects a treatment solution, the ink jet head 3*b* is used as a head that ejects an ink composition, and a portion at which the nozzle group for treatment solution used for recording and the nozzle group for ink composition used for recording overlap each other is included, alternate strike can be performed. In addition, when the ink jet head 3*a* is used as a head that ejects a treatment solution, the ink jet head 3*b* is used as a head that ejects an ink composition, a portion at which the nozzle group for treatment solution used for recording and the nozzle group for ink composition used for recording overlap each other is not included, and a nozzle group for treatment solution used for recording is provided upstream of the nozzle group for ink composition used for recording in the transport direction (sub-scanning direction SS) of the fabric, treatment solution first strike can be performed.

The printer 1 may be provided with a drying unit or a heating unit (neither of which is shown). The drying unit and the heating unit are units that efficiently dry the treatment solution or the ink adhered to the fabric 2. As long as the drying unit and the heating unit are provided at positions at which the fabric 2 can be dried and heated, the installation positions thereof are not particularly limited. In order to efficiently dry the ink or the treatment solution adhered to the fabric 2, for example, in FIG. 1, the drying unit and the heating unit can be installed at a position opposing the ink jet head 3.

Examples of the drying unit and the heating unit include a print heater mechanism that heats the fabric 2 in contact with a heat source, a mechanism that irradiates infrared rays or microwave that is an electromagnetic wave having a maximum wavelength of about 2,450 MHz, and the like, a dryer mechanism that blows warm air, and the like. Heating of the fabric 2 is performed before or when the droplets ejected from the nozzle of the ink jet head 3 are adhered to the fabric 2. Various heating conditions, for example, timing of heating execution, heating temperature, heating time, and the like are controlled by a control portion.

In addition, the drying unit and the heating unit may be installed on the downstream of the fabric 2 in the transport direction. In this case, the ink or the treatment solution ejected from the nozzle is adhered to the fabric 2 to form an image, and then the fabric 2 is heated. With this, drying properties of the ink or the treatment solution adhered to the fabric 2 are improved.

2. Example

Hereinafter, the present disclosure will be described in more detail with reference to examples, but the present disclosure is not limited to these examples. Hereinafter, "%" is based on mass unless otherwise specified.

2.1 Preparation of Treatment Solution Each component was put in a container so as to have the compositions shown in Tables 1 and 2 below, components were mixed and stirred with a magnetic stirrer for 1 hour, and then the mixture was filtered using a PTFE membrane filter of 8 μm to obtain a treatment solution according to each Example and each Comparative Example. Pure water was added so that the total amount of each treatment solution was 100% by mass. In addition, numerical values of the crosslinking agent and the non-crosslinking agent in Tables 1 and 2 below indicated the mass % in terms of solid content which is an active component.

TABLE 1

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Treatment solution composition (mass % concentration) | Crosslinking agent | Crosslinking agent 1 | 6 | | | | | | | | | |
| | | Crosslinking agent 2 | | 6 | | | | | | | | |
| | | Crosslinking agent 3 | | | 6 | 6 | 6 | 6 | 6 | 6 | | 1.3 |
| | | Crosslinking agent 4 | | | | | | | | | 6 | |
| | Non-crosslinking agent | Cationic resin | | | | | | | | | | |
| | Cationic agent | Calcium chloride | | | | | | | | | | |
| | | Magnesium sulfate | | | | | | | | | | |
| | Other solvents | Glycerin | 20 | 20 | 20 | 20 | 20 | 20 | 20 | 20 | 20 | 20 |
| | | Surfactant | 0.5 | 0.5 | 0.5 | 0.5 | 0.5 | 0.5 | 0.5 | 0.5 | 0.5 | 0.5 |
| | | Proxel XL2 | 0.2 | 0.2 | 0.2 | 0.2 | 0.2 | 0.2 | 0.2 | 0.2 | 0.2 | 0.2 |
| | | Pure water | Residue | Residue | Residue | Residue | Residue | Residue | Residue | Residue | Residue | Residue |
| Ink composition | | | Ink composition 1 | Ink composition 1 | Ink composition 1 | Ink composition 1 | Ink composition 1 | Ink composition 1 | Ink composition 1 | Ink composition 2 | Ink composition 1 | Ink composition 1 |
| Fabric | | | Cotton 100% | Cotton 100% | Cotton 100% | Cotton 100% | Cotton 100% | Cotton 100% | Cotton 100% | Cotton 100% | Cotton 100% | Cotton 100% |
| Treatment solution ejection amount (ng/dot) | | | 24 | 24 | 24 | 24 | 24 | 24 | 11 | 11 | 11 | 11 |
| Ink ejection amount (ng/dot) | | | 24 | 24 | 24 | 24 | 24 | 24 | 24 | 24 | 24 | 24 |
| Interval at treatment solution-ink ejection (second) | | | 4.5 | 4.5 | 4.5 | 30 | 4.5 | 0.3 | 0.3 | 0.3 | 0.3 | 0.3 |
| Resolution (treatment solution/ink) | | | 1200* 600 | 1200* 600 | 1200* 600 | 1200* 600 | 1200* 600 | 1200* 600 | 1200/ 1200* 600 | 1200/ 1200* 600 | 1200/ 1200* 600 | 1200/ 1200* 600 |
| Treatment solution adhesion amount mg/inch^2 | | | 17.28 | 17.28 | 17.28 | 17.28 | 17.28 | 17.28 | 17.28 | 17.28 | 17.28 | 17.28 |

TABLE 1-continued

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Ink adhesion amount mg/inch^2 | 17.28 | 17.28 | 17.28 | 17.28 | 17.28 | 17.28 | 17.28 | 17.28 | 17.28 | 17.28 |
| Number of passes | 4/4 | 4/4 | 4/4 | 4/4 | 4 | 4 | 4 | 4 | 4 | 4 |
| Strike order of treatment solution and ink | Treatment solution first | Treatment solution first | Treatment solution first | Treatment solution first | Alternate | Alternate | Alternate | Alternate | Alternate | Alternate |
| Friction fastness | C | C | B | C | A | A | A+ | B | B | A |
| Color developing properties | C | C | B | C | A | A | A | B | C | B |
| Ejection performance | A | A | A | A | A | A | A | A | B | A |
| Bleeding | B | B | B | B | A | A | A | B | B | B |

| | | | Example 11 | Example 12 | Example 13 | Example 14 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| Treatment solution composition (mass % concentration) | Crosslinking agent | Crosslinking agent 1 | | | | | | | | | | |
| | | Crosslinking agent 2 | | | | | | | | | | |
| | | Crosslinking agent 3 | 10 | 6 | 6 | 6 | | | 6 | 6 | 6 | 6 |
| | | Crosslinking agent 4 | | | | | | | | | | |
| | Non-crosslinking agent | Cationic resin | | | | | | 6 | | | | |
| | Cationic agent | Calcium chloride | | 2.5 | | | 2.5 | | | | | |
| | | Magnesium sulfate | | | 2.5 | | | | | | | |
| | Other solvents | Glycerin | 15 | 20 | 20 | 20 | 20 | 20 | 20 | 20 | 20 | 20 |
| | | Surfactant | 0.5 | 0.5 | 0.5 | 0.5 | 0.5 | 0.5 | 0.5 | 0.5 | 0.5 | 0.5 |
| | | Proxel XL2 | 0.2 | 0.2 | 0.2 | 0.2 | 0.2 | 0.2 | 0.2 | 0.2 | 0.2 | 0.2 |
| | | Pure water | Residue | Residue | Residue | Residue | Residue | Residue | Residue | Residue | Residue | Residue |
| Ink composition | | | Ink composition 1 | Ink composition 1 | Ink composition 1 | Ink composition 1 | Ink composition 1 | Ink composition 1 | Ink composition 1 | Ink composition 1 | Ink composition 1 | Ink composition 1 |
| Fabric | | | Cotton 100% | Cotton 100% | Cotton 100% | Cotton 100% | Cotton 100% | Cotton 100% | Cotton 100% | Cotton 100% | Cotton 100% | Cotton 100% |
| Treatment solution ejection amount (ng/dot) | | | 11 | 11 | 11 | 11 | 24 | 24 | About 50 to 100 | 48 | 24 | 24 |
| Ink ejection amount (ng/dot) | | | 24 | 24 | 24 | 24 | 24 | 24 | 24 | 48 | 48 | 11 |
| Interval at treatment solution-ink ejection (second) | | | 0.3 | 0.3 | 0.3 | 0.3 | 4.5 | 4.5 | 60 or more | 0.3 | 0.3 | 0.3 |
| Resolution (treatment solution/ink) | | | 1200* 1200/ 1200* 600 | 1200* 1200/ 1200* 600 | 1200* 1200/ 1200* 600 | 1200* 1200/ 1200* 600 | 1200* 600 | 1200* 600 | Spray application/ 1200* 600 | 600* 600 | 1200* 600/ 600* 600 | 1200* 600/ 1200* 1200 |
| Treatment solution adhesion amount mg/inch^2 | | | 17.28 | 17.28 | 17.28 | 17.28 | 17.28 | 17.28 | About 100 | 17.28 | 17.28 | 17.28 |
| Ink adhesion amount mg/inch^2 | | | 17.28 | 17.28 | 17.28 | 17.28 | 17.28 | 17.28 | 17.28 | 17.28 | 17.28 | 17.28 |
| Number of passes | | | 4 | 4 | 4 | 4 | 4/4 | 4/4 | 4 | 4/4 | 4/4 | 4/4 |
| Strike order of treatment solution and ink | | | Alternate | Alternate | Alternate | Alternate | Treatment solution first | Treatment solution first | Treatment solution first | Treatment solution first | Treatment solution first | Treatment solution first |
| Friction fastness | | | A++ | A | A+ | C | D | D | D | D | D | D |
| Color developing properties | | | A | A+ | A+ | C | D | C | D | D | D | C |
| Ejection performance | | | B | A | A | A | A | B | A | A | A | A |
| Bleeding | | | A | A | A | B | C | B | C | B | B | C |

The descriptions of Tables 1 and 2 above are supplemented as follows.

Treatment Solution Composition

Crosslinking Agent/Non-Crosslinking Agent

Crosslinking agent 1 (Unisense KHE107L, product name manufactured by Senka Co., Ltd., polyamine epichlorohydrin resin)

Crosslinking agent 2 (Milliogen P-20, product name manufactured by Senka Co., Ltd., melamine resin)

Crosslinking agent 3 (Kymene 557, product name manufactured by SOLENIS, polyamide epichlorohydrin resin)

Crosslinking agent 4 (Fixer #220, product name manufactured by Murayama Chemical Co., Ltd., blocked isocyanate resin)

Cationic resin (EP-1137, product name manufactured by Takamatsu Oil & Fat Co., Ltd., cationic polymer having no crosslinkability)

Other Solvents

Surfactant (Orfin E1010, product name manufactured by Nissin Chemical Industry Co., Ltd., acetylene glycolbased surfactant)

Proxel XL2 (product name manufactured by Ronza Japan Co., Ltd., antiseptic agent/antifungal agent)

Terms

"Treatment solution-ink ejection time difference": A time difference between an ink adhering step and a treatment solution adhering step, that is, a time difference from the last ejection of the treatment solution to the first ejection of the ink composition "Number of passes": The number of times of main scanning for adhering the ink composition and the treatment solution on the same region.

"Treatment solution first": Treatment solution first strike; a method of adhering the ink composition and the treatment liquid to the same scanning region of the fabric by different main scanning and performing strike, in which a layer containing the treatment solution is first formed, and then a layer containing the ink composition is laminated and formed.

"Alternate": Alternate strike; adhering the ink composition and the treatment solution to the same scanning region of the fabric by the same main scanning to form a layer containing the ink composition and the treatment solution 2. 2 Preparation of Ink Composition Each component was put in a container so as to have the composition shown in Table 3 below, components were mixed and stirred with a magnetic stirrer for 1 hour, and then the mixture was filtered using an 8 μm PTFE membrane filter to obtain an ink composition according to each ink composition. Pure water was added so that the total amount of the ink composition was 100% by mass.

With the pigment, a pigment dispersant solution was prepared in advance by mixing a pigment dispersant, which is a styrene/acrylic water-soluble resin not described in the table, and the pigment with water at a mass ratio of pigment: pigment dispersant=2:1 and stirring thereof, and the pigment dispersant solution was used for preparing ink.

TABLE 3

| | | | Ink composition 1 | Ink composition 2 |
|---|---|---|---|---|
| Ink composition | Resin particles | UW-1527F (product name manufactured by UBE Corporation, urethane resin) | 4.0 | |

TABLE 3-continued

| | | | Ink composition 1 | Ink composition 2 |
|---|---|---|---|---|
| (mass % concentration) | | Movinyl 6760 (product name manufactured by Nippon Synthetic Chemical Industry Co., Ltd., acrylic resin) | | 4.0 |
| | Pigment | PB15:3 (cyan pigment, C.I. pigment blue 15:3) | 3.5 | 3.5 |
| | Other solvent | Glycerin | 12.8 | 12.8 |
| | | TEG (triethylene glycol) | 4.5 | 4.5 |
| | | BTG (triethylene glycol monobutyl ether) | 0.7 | 0.7 |
| | | Orfin E1010 (product name manufactured by Nissin Chemical Industry Co., Ltd., acetylene glycol-based surfactant) | 0.5 | 0.5 |
| | | TEA (triethanolamine) | 1 | 1 |
| | | Pure water | Residue | Residue |

2. 3 Preparation of Printed Matter

Using a device modified from PX-H8000 (manufactured by Seiko Epson Corporation), printing was performed on a medium to be recorded made of 100% cotton white broad or 100% polyester satin under the conditions described in Tables 1 and 2 above to form a solid pattern image on an A4 size fabric which is the medium to be recorded. Then, the fabric was heat-treated at 160° C. for 3 minutes in an oven and dried to prepare a printed matter according to each Example and each Comparative Example. As the ink jet head, a head unit having a distance between nozzles of 600 dpi in a width direction of the medium to be recorded and 600 nozzles was used. In addition, the "solid pattern image" means an image in which dots are recorded for all pixels of the pixel which is the minimum recording unit region defined by a recording resolution (Duty 100%).

2.4. Evaluation Method 2.4.1 Friction Fastness

The friction fastness of the printed matter obtained above was tested by a test method based on ISO105-X12, and wet friction fastness was evaluated according to the following criteria. When the evaluation result is C or higher, it can be said that favorable friction fastness is obtained.

Evaluation Criteria

A++: Grade 4 to 5 or higher

A+: Grade 4

A: Grade 3 to 4

B: Grade 3

C: Grade 2 to 3 or higher and lower than Grade 3

D: Grade 2 or lower 2. 4. 2 Color Development

An OD value of cyan of the obtained printed matter was measured using a fluorescence spectrophotometer ("FD-7", manufactured by Konica Minolta Inc.) to evaluate color development according to the following criteria. When the evaluation result is C or higher, it can be said that favorable color development is obtained.

Evaluation Criteria

A+: OD value is 1.48 or more

C: OD value is 1.45 or more and less than 1.48

B: OD value is 1.40 or more and less than 1.45

C: OD value is 1.35 or more and less than 1.40

D: OD value is less than 1.35

2. 4. 3 Ejection Performance

Ejection performance of the treatment solution at the time of the above-mentioned "preparation of printed matter" was evaluated based on the following criteria. When the evaluation result is B or higher, it can be said that favorable ejection performance is obtained.

Evaluation Criteria

A: No nozzle omission occurs, and the printing surface is evenly and uniformly printed.

B: No nozzle omission occurs, and the printing surface is evenly and uniformly printed. When left for 2 hours, nozzle omission occurs and head cleaning is required.

C: The nozzle is missing, and the printing surface is not locally dyed.

2. 4. 4 Bleeding

For the evaluation of bleeding, the same printed matter as that used in the above "friction fastness" test was used. Aggregation unevenness of the ink in the solid pattern of the printed matter was visually observed and evaluated according to the following evaluation criteria. When the evaluation result is B or higher, it can be said that a favorable result is obtained.

Evaluation Criteria

A: Aggregation unevenness was not observed in the solid pattern.

B: Some aggregation unevenness was observed in the solid pattern.

C: Aggregation unevenness was observed in the solid pattern as a whole.

2. 5. Evaluation Result

The evaluation result is shown in Tables 1 and 2 above.

From Tables 1 and 2 above, a method of performing recording on a fabric includes an ink adhering step of adhering droplets of an ink composition containing a pigment and resin particles to the fabric; and a treatment solution adhering step of adhering droplets of a treatment solution containing a crosslinking agent to the fabric, a maximum weight per droplet of the droplet of the ink composition is 30 ng or less, a maximum weight per droplet of the droplet of the treatment solution is 30 ng or less, a droplet weight of the treatment solution is equal to or less than the droplet weight of the ink composition, and the recording method according to each example is excellent in both color developing properties and friction fastness.

From the comparison between Examples 1 to 3 and Comparative Examples 1 and 2, when the treatment solution contained a crosslinking agent that reacts with the resin particles in the ink, friction fastness and color developing properties were good.

From the comparison between Example 3 and Comparative Examples 3 to 6, print quality was good when the ejection amounts of the treatment solution and the ink were smaller and when the ejection amount of the treatment solution was smaller than that of the ink. More specifically, when the treatment solution was spray-applied, the adhesion amount increased and the water content also increased, and thus bleeding easily occurred, the drying properties were poor, and friction fastness was also lowered (Comparative Example 3). It is considered that when the droplets are large, the treatment solution or ink easily permeates the cloth, the amount of the crosslinking agent in the vicinity of the surface decreases, and the effects of improving friction fastness and color developing properties are lowered (Comparative Example 4).

When an ejection size of the ink was large, unevenness occurred because dyeing did not uniformly occur, and thus color developing properties were lowered, and resin particles could not be uniformly applied and friction fastness was also lowered (Comparative Example 5). When an ejection size of the treatment solution was large, the crosslinking agent was not uniformly applied and thus the effect of improving friction fastness was small, and when the ejection size of the ink was too small, unevenness occurred due to wind patterns and the bleeding evaluation deteriorated (Comparative Example 6).

From Examples 1 to 3, depending on the type of the crosslinking agent, friction fastness or color developing properties became good, and in particular, the polyamide epichlorohydrin resin of the crosslinking agent 3 had a high effect.

From Examples 3 and 4, when the ejection time difference was longer, friction fastness or color developing properties were slightly lowered, and thus it was good for the time difference to be within 5 seconds. It is considered that this is because the previously applied treatment solution permeates the cloth, and thus the amount of the crosslinking agent in the vicinity of the surface decreases and the effect of improving friction fastness or color developing properties are reduced.

From Examples 3 and 5, alternate strike showed better friction fastness or color developing properties. It is considered that this is because the crosslinking agent easily reacts with the resin particles in the ink by forming a layer containing the ink and the treatment solution and forming the treatment solution and the ink in a millefeuille shape.

In Examples 5 and 6, there was almost no difference in print quality. With this, it is considered that when the time difference is within 5 seconds, the effects of improving friction fastness and improving color developing properties are sufficient.

From Examples 6 and 7, when the ejection amount of the treatment solution was smaller than that of the ink, friction fastness and color developing properties became good. It is considered that this is because when the treatment solution is finely applied, the treatment solution is uniformly dispersed on the surface of the cloth, and it becomes easier to react with the resin particles or the cloth in the ink.

From Example 8, when the resin particles in the ink were changed to those having no OH group, the quality was deteriorated. It is considered that this is because the crosslinking agent cannot react with the resin particles.

From Example 9, when a non-cationic crosslinking agent was used, color developing properties and bleeding were lowered. With this, the crosslinking agent is preferably cationic.

From Examples 7, 10, and 11, the print quality was improved as the amount of the crosslinking agent was increased, but the ink jet ejection performance was deteriorated.

When a polyvalent metal salt was added from Examples 7, 12, and 13, color developing properties were further improved. It was found that, depending on the type of the polyvalent metal salt, aggregating ability may be too high and friction fastness may be lowered, and among $MgSO_4$ and $CaCl_2$, $MgSO_4$ is better.

From Example 14, it was found that the effect is applied not only to fabrics made of 100% cotton but also to fabrics made of various materials.

The following contents are derived from the above-mentioned embodiment.

An aspect of the recording method includes a recording method on a fabric, the method including:

an ink adhering step of adhering droplets of an ink composition containing a pigment and resin particles to the fabric; and a treatment solution adhering step of adhering droplets of a treatment solution containing a crosslinking agent to the fabric, in which a maximum weight per droplet of the droplet of the ink composition is 30 ng or less, the maximum weight per droplet of the droplet of the treatment solution is 30 ng or less, and a droplet weight of the treatment solution is equal to or less than a droplet weight of the ink composition.

In an aspect of the recording method,

The droplet weight of the treatment solution may be smaller than the droplet weight of the ink composition.

In any aspect of the recording method, a time difference between the ink adhering step and the treatment solution adhering step may be within 5 seconds.

In any aspect of the recording method,

The treatment solution adhering step and the ink adhering step are performed by an ink jet method, in the ink jet method, main scanning is performed a plurality of times for recording by moving an ink jet head in a direction perpendicular to a transport direction of the fabric, the treatment solution and the ink composition are adhered to the same scanning region of the fabric by the same main scanning, and the same main scanning may be performed a plurality of times with respect to the same scanning region.

In any aspect of the recording method, the crosslinking agent may be a crosslinking agent that reacts with a hydroxyl group.

In any aspect of the recording method, the resin particles may be a urethane resin.

In any aspect of the recording method, the fabric may have a hydroxyl group.

In any aspect of the recording method, the crosslinking agent may be one or more selected from a polyamide epichlorohydrin resin, a polyamine epichlorohydrin resin, a melamine resin, and a blocked isocyanate resin.

In any aspect of the recording method, the crosslinking agent may be cationic.

In any aspect of the recording method, a content of the crosslinking agent may be 1 to 10% by mass with respect to the total amount of the treatment solution.

In any aspect of the recording method, the treatment solution may further contain a polyvalent metal salt.

In any aspect of the recording method, the ink jet head may have a configuration in which a nozzle group for treatment solution used for recording is provided upstream of or in an overlapping portion of a nozzle group for ink composition used for recording in a transport direction of the fabric.

The present disclosure is not limited to the above-mentioned embodiment, and various modifications can be done. For example, the present disclosure includes a configuration substantially the same as the configuration described in the embodiment, for example, a configuration having the same function, method, and effect, or a configuration having the same object and effect. In addition, the present disclosure also includes a configuration in which a non-essential part of the configuration described in the embodiment is replaced. In addition, the present disclosure includes a configuration that exhibits the same effects as the configuration described in the embodiment or a configuration that can achieve the same object. In addition, the present disclosure includes a configuration in which a known technique is added to the configuration described in the embodiment.

What is claimed is:

1. A recording method on a fabric, comprising:

an ink adhering step of adhering droplets of an ink composition containing a pigment and resin particles to the fabric; and a treatment solution adhering step of adhering droplets of a treatment solution containing a crosslinking agent to the fabric, wherein a maximum weight per droplet of the droplet of the ink composition is 30 ng or less, a maximum weight per droplet of the droplet of the treatment solution is 30 ng or less, and a droplet weight of the treatment solution is equal to or less than a droplet weight of the ink composition, wherein the crosslinking agent is selected from the group consisting of polyamide epichlorohydrin resin, polyamine epichlorohydrin resin, and melamine resin.

2. The recording method according to claim 1, wherein the droplet weight of the treatment solution is less than the droplet weight of the ink composition.

3. The recording method according to claim 1, wherein a time difference between the ink adhering step and the treatment solution adhering step is within 5 seconds.

4. The recording method according to claim 1, wherein the treatment solution adhering step and the ink adhering step are performed by an ink jet method, in the ink jet method, an ink jet head is moved in a direction perpendicular to a transport direction of the fabric to perform recording and main scanning is performed a plurality of times, the treatment solution and the ink composition are adhered to the same scanning region of the fabric by the same main scanning, and the same main scanning is performed a plurality of times on the same scanning region.

5. The recording method according to claim 1, wherein the crosslinking agent is a crosslinking agent that reacts with a hydroxyl group.

6. The recording method according to claim 1, wherein the resin particles are a urethane resin.

7. The recording method according to claim 1, wherein the fabric has a hydroxyl group.

8. The recording method according to claim 1, wherein the crosslinking agent is cationic.

9. The recording method according to claim 1, wherein a content of the crosslinking agent is 1% to 10% by mass with respect to a total amount of the treatment solution.

10. The recording method according to claim 1, wherein the treatment solution further contains a polyvalent metal salt.

11. The recording method according to claim 4, wherein the ink jet head has a configuration in which a nozzle group for treatment solution used for recording is provided upstream of or in an overlapping portion of a nozzle group for ink composition used for recording in a transport direction of the fabric.

* * * * *